Figure 1:
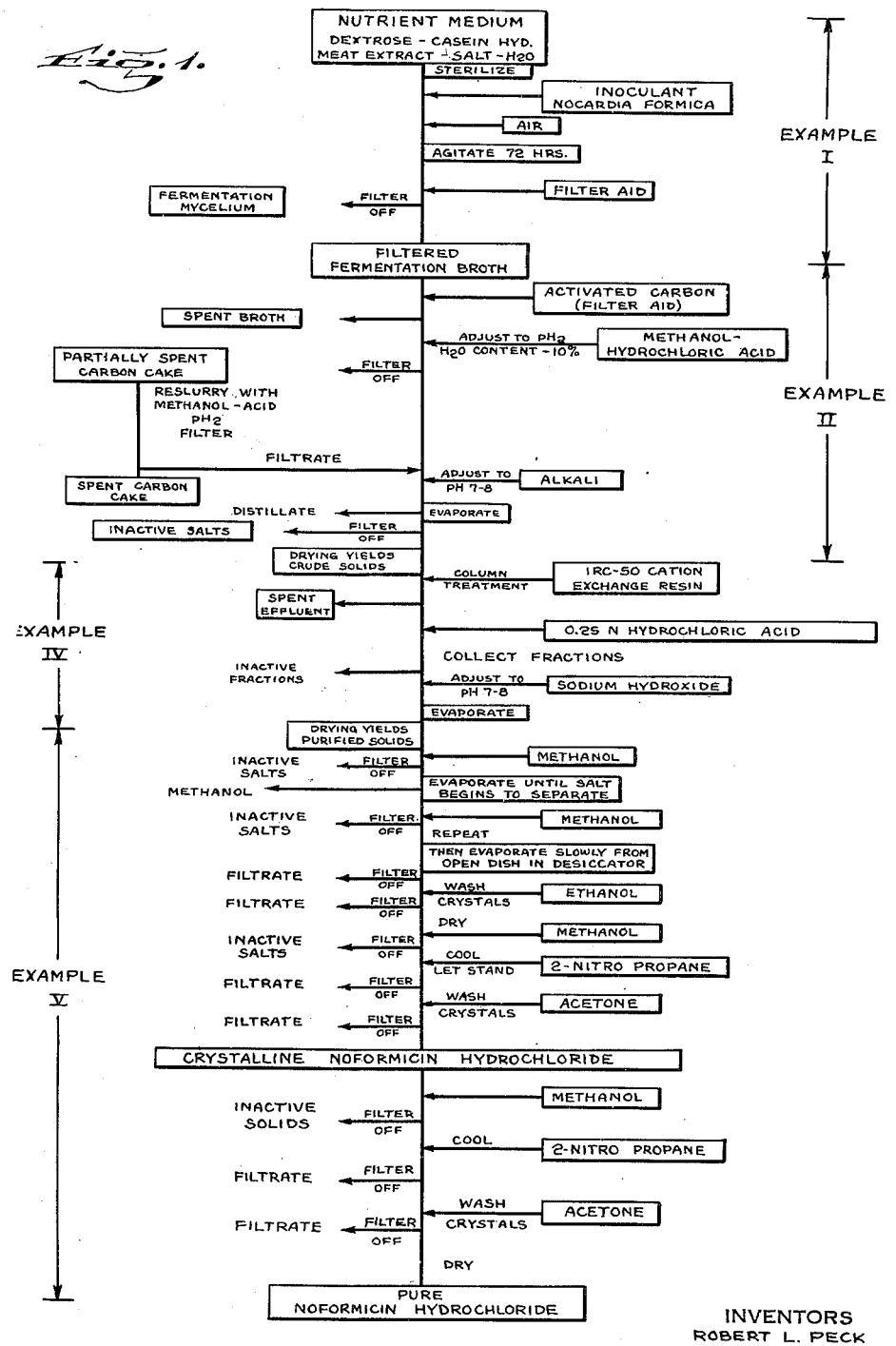

Aug. 27, 1957 R. L. PECK ET AL 2,804,463

BETA-(5-IMINO-2-PYRROLIDINE-CARBOXAMIDO)-PROPAMIDINE

Filed June 27, 1956 3 Sheets-Sheet 1

INVENTORS
ROBERT L. PECK
HENRY M. SCHAFER
BY FRANK J. WOLF

ATTORNEY

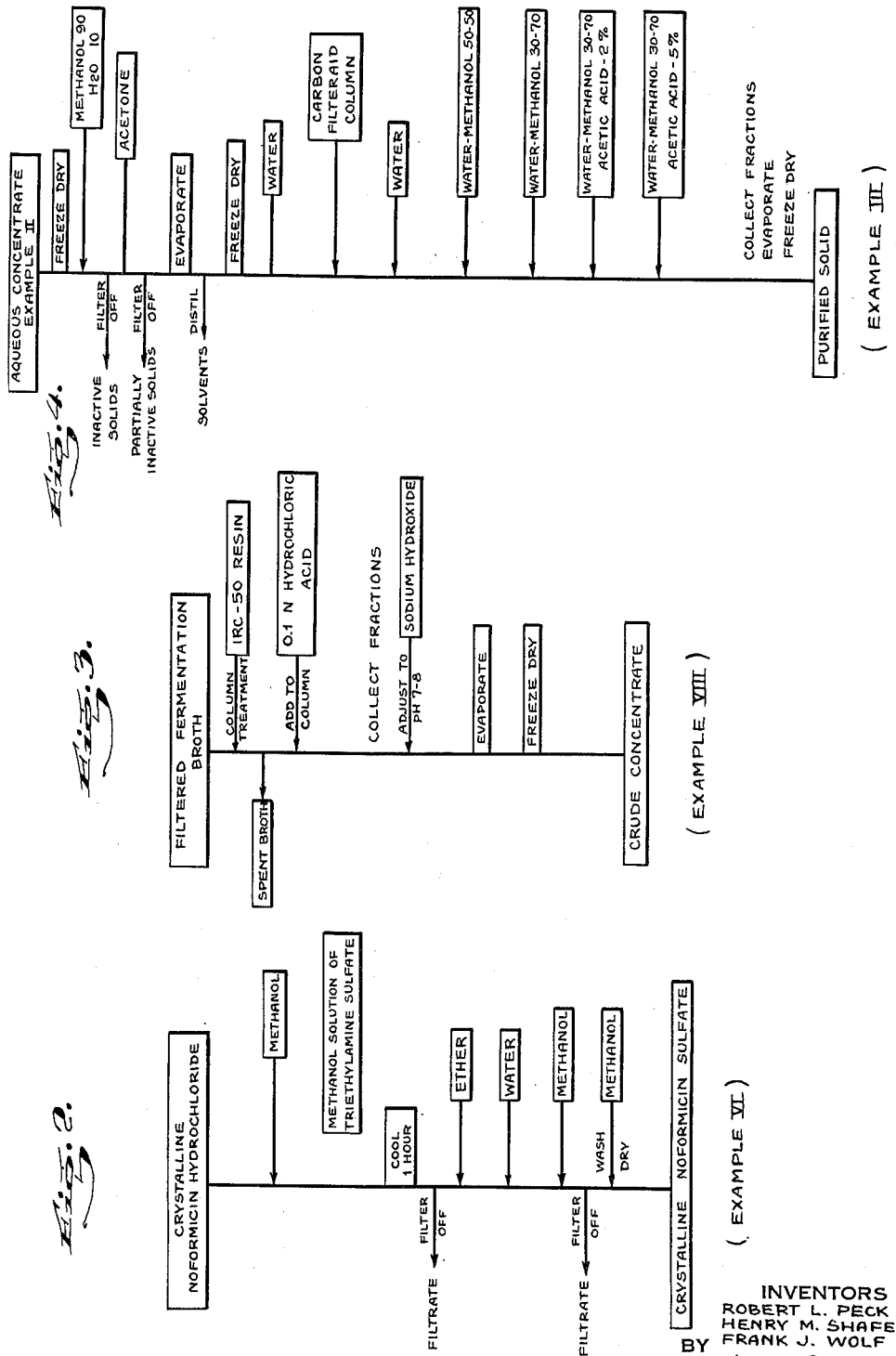

Aug. 27, 1957   R. L. PECK ET AL   2,804,463
BETA-(5-IMINO-2-PYRROLIDINE-CARBOXAMIDO)-PROPAMIDINE
Filed June 27, 1956   3 Sheets-Sheet 3

INVENTORS
ROBERT L. PECK
HENRY M. SHAFER
BY FRANK J. WOLF
Howard E. Thompson Jr
ATTORNEY

United States Patent Office 2,804,463
Patented Aug. 27, 1957

2,804,463

BETA-(5-IMINO-2-PYRROLIDINE-CARBOXAMIDO)-PROPAMIDINE

Robert Lawrence Peck, deceased, late of Plainfield, N. J., by Helen McL. Peck, administratrix, Binghamton, N. Y., and Henry M. Shafer, Elizabeth, and Frank J. Wolf, Westfield, N. J., assignors to Merck & Co., Inc., Rahway, N. J., a corporation of New Jersey Application June 27, 1956, Serial No. 594,267

20 Claims. (Cl. 260—326.3)

This invention relates to a new antiviral substance and to procedures for producing the same from broth formed in submerged aerated fermentation with the organism *Nocardia formica*. More particularly, the invention relates to the production of an antiviral substance by subjecting a fermentation broth of the class described to a plurality of adsorption, elution and chromatographic procedures yielding purified concentrates having antiviral activity, and further treating such purified concentrates to obtain crystalline acid salts of the antiviral substance. This application is a continuation-in-part of copending application Serial No. 377,238, filed August 28, 1953, now abandoned.

The new antiviral substance is a nitrogeneous, basic, water-soluble, dialysable, somewhat solvent-soluble, colorless organic substance forming a dihydrochloride and similar acid addition salts. The structure of this substance (shown as the dihydrochloride salt) is as follows:

$$\text{HCl·HN=C} \begin{matrix} H_2 & H_2 \\ C-C & O \\ | & | & \| \\ & C-C-NH-CH_2CH_2-C \\ \diagdown N \diagup H & \diagdown NH_2\cdot HCl \\ H & \end{matrix} \diagup NH$$

The structure corresponds with the name β-(5-imino-2-pyrrolidine-carboxamido)-propamidine dihydrochloride. The coined name "Noformicin" has been applied to the basic substance, and under this terminology which may be used hereinafter in the specification and claims the hydrochloride salt is known as Noformicin hydrochloride.

The new antiviral substance, whether in the form of a purified concentrate, or a crystalline salt, has been found primarily useful in the treatment of plant virus and particularly tobacco mosaic virus, an infection of tobacco which causes serious damage to leaf tissue. This substance also exhibits antiviral activity against swine influenza when tested in mice, thus providing a practical assay procedure which is hereinafter described.

The starting material employed in producing the new antiviral substance is a fermentation broth obtained by submerged aerated fermentation which the organism *Nocardia formica* a newly discovered organism which has been deposited with the Northern Regional Research Laboratory, Peoria, Ill., as culture number N. R. R. L. 2470, and which can be characterized and identified by its cultural and morphological properties as described in the following table:

Cultural and Morphological characteristics of Nocardia formica

Morphology:
    Vegetative—Extensive mycelial development, no fragmentation of hyphae. Forms ghost-filaments and cytoplasmic condensations.
    Submerged—Straight and curved rods; Y and V forms. Rods 0.9–1.1 x 1.3–6.0 microns. Gram-positive, non-acid fast.

Gelatin stab: After four days, liquefaction. Grayish-white colonies submerged. No soluble pigment.
Nutrient agar slant: Fair growth. No aerial mycelium.
Nutrient broth: Flocculent growth.
Starch agar: Hydrolyzed. No soluble pigment.
Glucose asparagine: Fair growth. Aerial mycelium grayish-white.
Glycerol nutrient agar: Very poor growth.
Litmus milk: Peptonized. Neutral.
Nitrate agar: Nitrites produced.
Czapeka-sucrose solution: Sparse growth.
Czapeka-sucrose agar: Very poor growth.
Potato wedge: Very poor growth.
Casein: Hydrolyzed.
Dorset's egg medium: Excellent growth, buff-colored, convoluted, moist. No liquefaction. Medium not discolored.
Loeffler's blood serum: Excellent growth, buff-colored, convoluted, medium 50% liquefied. Medium and exudate brown.
Paraffin: Not capable of utilizing paraffin.
Phenol: Not capable of utilizing phenol.
Reaction in inorganic medium containing carbohydrates:
    0.5% glucose—acid.
    0.5% glycerol—acid.
    0.5% lactose—acid.
    0.5% maltose—acid.
    0.5% sucrose—no change.
Other characteristics:
    Aerobic.
    Optimum temperature—28° C.
    Optimum pH—7.0–7.5

Fermentation with the organism *Nocardia formica* is conducted under submerged aerated conditions using a sterilized nutrient medium containing a complex nitrogenous nutrient, a sugar, and inorganic salts, the fermentation being continued for about 72 hours at about 28° C. A suitable nutrient medium may contain, for example, 1% dextrose, 1% casein hydrolysate, 0.3% meat extract, 0.5% NaCl, and 97.2% water. After completion of the fermentation the mycelium is removed by filtration and the resulting filtered broth is the fermentation product which constitutes the starting material for the procedures of the present invention. This fermentation process was disclosed and claimed in an application of Pollard, Serial No. 372,157 filed August 3, 1953 (now abandoned).

The process of the present invention comprises contacting fermentation broth produced by the organism *Nocardia formica* with an adsorbent material, such as charcoal or a cation exchange resin deriving its exchange capacity from carboxylic groups, separating the adsorbent from residual liquid, eluting the adsorbed material with an aqueous acid solution, preferably aqueous-alcoholic acid when charcoal is the adsorbent, and then neutralizing and concentrating the eluate at least to small volume and preferably to dryness to form a crude concentrate containing antiviral activity. This concentrate in aqueous solution is then subjected to chromatographic purification on an adsorbent material such as charcoal or a cation exchange resin, particularly of the type deriving its exchange capacity from carboxylic groups, the chromatograph being developed and fractions at progressively lower pH being eluted by means of aqueous solutions of a lower aliphatic acid such as acetic or propionic acid, or a mineral acid, such as hydrochloric or sulfuric acid. When charcoal is used in the chromatography the aqueous solution employed for development and elution is preferably an aqueous alcoholic solution, suitably acidified as above described. Antiviral activity appears in eluate fractions having a pH of about 6.0 and lower. The acidic eluate fractions are then neutralized by means of aqueous alkali such as aqueous sodium hydroxide, concentrated to small volume and freeze dried to yield antiviral concentrates which can be used without further purification in the combating of plant virus such as tobacco mosaic virus.

A purified concentrate containing the hydrochloride of the antiviral substance can be employed for the production of crystalline salts of the antiviral substance, preferably by first preparing the crystalline hydrochloride salt. The concentrate containing the hydrochloride need not be dried, but can be merely concentrated to small volume. Alternatively the dried concentrate can be redissolved in water for further processing in obtaining crystalline products. Mineral salts are first removed by adding a lower aliphatic alcohol, preferably methanol, and concentrating under reduced pressure to cause crystallization of such salts, which can then be filtered off. This may be repeated several times until mineral salts are substantially eliminated. The solvents are then removed in vacuo until a thick slurry of crude crystals is obtained, and the crystals are collected by filtration.

The crude crystalline material is dissolved in a lower aliphatic alcohol, preferably methanol, and diluted with about five volumes of 2-nitropropane. Upon cooling this mixture purified crystals separate and are recovered. By recrystallization in this manner crystalline hydrochloride of the antiviral substance can be obtained having a purity, by solubility analysis, of $99.8 \pm 0.2\%$. Recrystallization can also be effected using other solvent mixtures such as methanol-acetone and methanolether. This product has an equivalent weight of 268; $pKa=9.4$ and shows characteristic infrared adsorption as follows: broad adsorption in the $3-4\mu$ region, at least two bands at $5.92\mu$ and $6.0\mu$, and a moderate band at $6.45\mu$. When assayed for antiviral activity against swine influenza in mice according to the procedure hereinafter described the pure hydrochloride shows a survival index (S. I.) of 2.29 at 2 x 0.25 mg. dose and 1.79–1.91 at 2 x 0.1 mg. dose.

Other crystalline salts of the antiviral substance can be prepared from the hydrochloride, as for example by adding to a warm methanolic solution of the hydrochloride an excess of a methanol soluble salt such as triethylamine sulfate and cooling to crystallize the sulfate salt of the antiviral substance.

In some instances the conversion can be made in aqueous solution. Thus if picric acid is added to a warmed aqueous solution of the hydrochloride, and the solution is then cooled, yellow crystals of the picrate salt of the antiviral substance are obtained.

In the procedure above described the early purification by charcoal chromatography may be carried out as follows: A crude concentrate, as for example a dried product obtained after adsorption of active material from fermentation broth, elution with acidic aqueous alcohol, neutralization, and a drying, is discolored in water, and this or a similar water solution is passed through a chromatographic column of charcoal, preferably mixed with cellulose fiber. The column is developed with water, aqueous alcohol, and finally with acidic aqueous alcohol. A ratio ranging from 5 parts of charcoal to 1 part of solids( in the solution treated) to about 50 parts ol charcoal to one part of solids has been found satisfactory. The alcohol should be one of the lower aliphatic alcohols such as methanol, ethanol, or propanol. The acidifying agent employed may be any non-oxidative, non-reductive mineral acid, such as hydrochloric and sulfuric acids, as well as lower aliphatic acids, such as acetic and propionic acids. A 0.1 N solution of hydrochloric acid is preferred.

The active material appears in the effluent when the pH of the effluent becomes acidic. One displacement volume usually contains the bulk of the activity. The selected fractions are then neutralized with aqueous alkali and evaporated to dryness in vacuo, or alternatively, they may be evaporated without neutralization. The fractions thus obtained are rather gummy and may be dissolved in a lower aliphatic alcohol, such as methanol and precipitated in granular form by adding a miscible non-solvent for the product, such as diethyl ether or diethyl ether-acetone mixture.

The ion-exchange resin procedure is the presently preferred procedure and may be carried out as follows: A crude concentrate is dissolved in water and the solution is passed through a column containing a cation exchange resin on the sodium cycle, preferably a cation exchange resin which derives its exchange capacity from carboxylic groups, such as Duolite CS–100, produced by Chemical Process Co., and Amberlite IRC–50 resin, a product of Rohm & Haas Co. The antiviral activity remains on the column and a large portion of the impurities pass through the column and are eliminated. The column is then eluted with an aqueous mineral acid, such as hydrochloric or sulfuric acid, or with an aqueous solution of a lower aliphatic carboxylic acid, such as acetic or propionic acid. One normal hydrochloric acid is preferred. Active material appears in the effluent as it becomes acidic, particularly below pH 6.0. The collected fractions of effluent are then neutralized, filtered, concentrated and freeze dried to obtain a solid concentrate, or may be used directly after neutralizing and filtering for further processing to obtain crystalline material as above described.

While ion exchange purification has been described as following initial adsorption of active material from fermentation broth on charcoal and elution with acidic aqueous alcohol, it should be understood that a cation exchange resin can be employed in the manner described to initially recover active material from fermentation broth. A first resin treatment is then followed by a second resin chromatographic treatment to obtain the desired concentration and purification of antiviral substance.

The activity of the antiviral substance against swine influenza may be determined by employing the following assay procedure; seed material for the swine influenza test may be prepared by infecting 12 mice intranasally with swine influenza virus (Iowa+15). After about 3 days the mice are sacrificed, the lungs are removed and ground in a mortar. The ground lungs are homogenized aseptically in saline containing a phosphate buffer at pH 7.3, the suspension being made 5% by weight. The suspension is centrifuged and the supernatnet liquid distributed in vials, frozen in an alcohol-Dry Ice mixture and store in Dry Ice. This seed material is then titrated in mice using dilutions of $10^{-4,-5,-6}$. For this titration, the mice are anaesthetized with a chloroform-ether mixture (1:2) and 0.05 ml. of diluted seed material administered. Based on the outcome of this titration, the infecting dose is chosen to give 100% deaths with an average survival time of 4 to 5 days.

In the routine tests, groups of six or more mice are infected with the chosen dose of swine influenza virus. The antiviral substance for testing is administered subcutaneously 3 and 24 hours after infecting. Evidence of activity is based on the increase in survival time of treated mice as compared to control mice. This is expressed numerically as the quotient obtained by dividing the average survival time of the treated mice by the average survival time of the control mice and is called the survival index. In a routine test where six mice are used, a survival index of 1.31 is considered indicative of significant prolongation of life; when twelve mice are used, an index of 1.21 is considered indicative of significant prolongation of life.

The following examples will serve to show how procedures for preparing active concentrates and crystalline products in accordance with the present invention can be carried out, but it is to be understood that these examples are given by way of illustration and not of limitation. Example 1 which shows the preparation of the starting fermentation product is taken from said application of Pollard, Serial No. 372,157, filed August 3, 1933 (now abandoned).

As an aid to a consideration of the examples it should be noted that Examples I, II, IV and V represent the preferred overall process for obtaining crystalline Noformicin hydrochloride which is illustrated by the flow sheet in Fig. 1 of the drawing. Example VI describing the conversion of the hydrochloride to the sulfate is illustrated by the flow sheet of Fig. 2 of the drawing. Example VIII describing an alternate for the procedure of Example II is illustrated by the flow sheet of Fig. 3 of the drawing. Example III describing an alternate for part of the procedure shown in Example V is illustrated by the flow sheet in Fig. 4 of the drawing.

Example I

A nutrient medium is prepared having the following composition:

| | Percent |
|---|---|
| Dextrose | 1 |
| Casein hydrolysate | 1 |
| Meat extract | 0.3 |
| NaCl | 0.5 |
| H₂O | 97.2 |

2,000 gallons of the above medium having a pH of about 7.0 is sterilized by heating for 15 minutes at 120° C. The inoculum is prepared as follows: The *Nocardia formica* microorganism is usually stored in a soil tube or under mineral oil on an agar slant. A 250 ml. shake flask charged with the above-described meat medium is inoculated with the organism and shaken at 20° C. until good growth resulted (24–48 hours). This flask is then used to inoculate a 2 liter flask containing about 750 ml. of the meat medium and is shaken at 28° C. for 35–48 hours. This broth is then used to inoculate a 300 gallon tank containing the same meat medium and is allowed to ferment for 40 hours at 28° C. This 300 gallon batch is then used as inoculum for the 2000 gallon batch. The inoculated medium is fermented under submerged conditions with agitation and forced aeration for 72 hours at 28° C. The consumption of dextrose and pH of the medium is shown in the following table:

| Time (Hours) | pH | Dextrose, mg./ml. |
|---|---|---|
| Initial | 6.6 | 9.9 |
| 12 | 6.8 | 3.9 |
| 24 | 7.4 | 1.1 |
| 36 | 7.8 | 0.1 |
| 42 | 8.2 | |
| 60 | 8.5 | |
| 72 | 8.5 | |

The mycelium is then removed by filtration to yield the fermentation product.

Example II

Filtered fermentation broth obtained as described in Example I above was slurried with 1% charcoal (Darco G–60) and about 0.2% filter aid (Supercel) for a few hours. The mixture was then filtered and the filtrate discarded. The charcoal-Supercel cake was slurried with 2 x 100 gallons of 90% methanolic hydrogen chloride (pH 2), filtered and the filter cake discarded after washing. The combined filtrates were neutralized with sodium hydroxide and concentrated in vacuo to about 25 gallons at a temperature below 40° C., water was added and the methanol striped off under reduced pressure to a final volume of about 25 gallons. The resulting aqueous solution of antiviral substance contained some precipitated solids which were removed by filtration. The solution thus obtained had a total solids content of 80 mg./ml. and a survival index of 1.44 at a 9 mg. dose level in the standard swine influenza virus assay on 12 mice.

Alternatively, the methanol solution of antiviral substance may be concentrated to dryness yielding a crude, solid concentrate containing the bulk of the antiviral activity. The concentrate can be dissolved in water for assaying or further processing.

Example III

Sixty grams of a solid concentrate prepared as described in Example II was stirred for one-half hour with 1 liter of 90% methyl alcohol. The insoluble material was removed and weighed 2.5 g. (S. I. 0.95 at 5-mg. dose). To the residual solution was added 2 liters of acetone causing the precipitation of 13.5 g. of amorphous solid (S. I. 1.12 at 5-mg. dose). The mother liquor from this precipitation was evaporated in vacuo to a syrup and freeze dried to give 46.3 g. of solid product (S. I., 1.1 at 5-mg. dose). A 45.6 g. sample of the latter product was dissolved in water for chromatographic purification.

A column 6.5 cm. in diameter and 50 cm. high was packed with a dry mixture of 200 g. each of charcoal (Darco G–60) and cellulose fiber. Distilled water was allowed to run into this column of adsorbent until one-column volume had entered the adsorbent layer. At this time (after introduction of 1150 ml. of water) the solution described above (188 ml.) was run into the column. An additional 1.5 l. of water was then used for development and was followed by 1.5 l. of 50% methanol, 1.5 l. of 70% methanol, and two liters each of 2% acetic acid and 5% acetic acid in 70% methanol.

Eluate fractions of approximately 500 ml. each were taken. These fractions were evaporated to a small volume of aqueous solution and were freeze dried. All of the fractions as well as a sample of the original starting material were submitted for assay. The results are summarized in the following table. From the table it will readily be seen that column fractions 16, 17 and 18 represented the most active solid material. It is noted that all the fractions were assayed using the same dose, namely 5 mg.

DATA ON CHROMATOGRAPHIC FRACTIONS

| Fraction [1] No. | Volume [2] ml. | Wt. of Solid, g. | S. I. (Swine flu) at 5-mg. dose |
|---|---|---|---|
| 5 | 550 | 0.14 | 0.95 |
| 6 | 470 | 0.44 | 1.09 |
| 7 | 660 | 15.80 | 1.12 |
| 8 | 550 | 3.58 | 1.05 |
| 9 | 555 | 1.08 | 1.12 |
| A | | | |
| 10 | 635 | 1.98 | 1.21 |
| 11 | 600 | 1.46 | 0.93 |
| 12 | 460 | 0.95 | 1.02 |
| B | | | |
| 13 | 500 | 0.89 | 1.12 |
| 14 | 460 | 0.53 | 1.23 |
| C | | | |
| 15 | 590 | 1.91 | 1.30 |
| 16 | 530 | 2.31 | 1.50 |
| 17 | 500 | 1.84 | 1.60 |
| 18 | 940 | 1.86 | 1.50 |
| D | | | |
| 19 | 475 | 1.30 | 1.30 |
| 20 | 740 | 0.89 | 1.20 |
| Starting material | | | 1.12 |

[1] Fraction 5 represents the first filtrate from the column; fractions 5 and 6 thus represent most of the water pre-wash.
[2] One column-volume was 1150 ml.

A. 50% methanol breakthrough (approximate position).
B. 70% methanol breakthrough.
C. 2% acetic acid—70% methanol breakthrough.
D. 5% acetic acid—70% methanol breakthrough.

Example IV

A crude solution prepared as described in Example II (survival index of 1.44 at a 9 mg. dose and 1.17 at a 3 mg. dose or approximately 1.34 at a 5 mg. dose level), containing 7,300 grams of solids (total volume about 91 liters) was put through a column 4.7 cm. in diameter and 146 cm. high containing 1,800 grams of a carboxylic type cation exchange resin (Amberlite IRC–50, a cation exchange resin obtained by the copolymerization of methacrylic acid and divinyl benzene wherein the divinyl benzene constitutes 2½ to 5% of the resin composition) on the sodium cycle. The solution was allowed to flow through the column at a rate of approximately 3.5 liters/hour. Water (4 liters) was used as the first developing solvent followed by 0.25 N hydrochloric acid. The pH of the eluate was determined periodically and the receiver changed when a definite drop in the pH was noticed. The acidic fractions were neutralized with sodium hydroxide, concentrated under reduced pressure to a small volume and freeze dried. The data obtained on the individual fractions of this experiment are shown in the following table:

| Fraction Number | Fraction Volume (l.) | pH of Fraction | Wt. of Fraction, g. | Survival Index (5 mg. dose)[1] |
|---|---|---|---|---|
| 1 | 91+4 (Spent crude extract). | | 7,000 | 1.21 |
| 2 | 9.05 [2] | 7.6 | 93 | 1.03 |
| 3 | 5.60 [2] | 7.6 | 95 | 1.45 |
| 4 | 3.35 [2] | 7.6 | 67 | 1.58 |
| 5 | 1.85 [2] | 6.0 | 44 | 2.13 |
| 6 | 1.88 [2] | 4.0 | 43 | 2.05 |
| 7 | 3.20 [2] | 2.0 | 56 | 1.85 |
| 8 | 7.00 [2] | 1.3 | 134 | 1.13 |

[1] The activity of the product was assayed by the routine mouse assay previously described.
[2] 0.25 N HCl.

Example V

The neutralized rich cuts from an IRC–50 column (similar to those obtained in Example IV above) were concentrated in a circulating evaporator below 40° C. until the inorganic salts began to crystallize. The concentrate was diluted with 2 volumes of methanol and cooled. After removal of salts by filtration, the concentration and methanol dilution were repeated twice more. Finally the solution was concentrated until a syrupy solution remained.

This solution was evaporated to a thick mush of crystals in a vacuum desiccator over $CaCl_2$. The solid crystalline material was removed by filtration and slurried with 3 x 10 ml. portions of ethanol and dried.

30 g. of the material thus obtained was dissolved in 600 ml. of methanol. The solution was filtered through a sintered glass funnel and the insoluble product washed with 120 ml. of methanol. The filtrate was diluted with 3600 ml. of 2-nitropropane and chilled over night (0–5° C.). The crystalline product was then filtered, washed with three small portions of acetone, and dried. The crystalline product weighed 5.10 g.

This sample was combined with 10 g. of material obtained in the same manner and dissolved in about 550 ml. of methanol by warming to 50° C. The warm solution was filtered and diluted with methanol up to a total volume of 600 ml. To this methanol solution was added 3,000 ml. of 2-nitropropane whereupon the product began to crystallize from solution immediately (crystallization began after 2 liters had been added). The resulting mixture was chilled (0–5° C.) over night, filtered, washed with acetone and dried. The product weighed 14.21 g. and melted with decomposition at 265° C.

The crystalline hydrochloride salt of the antiviral substance thus obtained was found by solubility analysis to have a purity of 99.8+ or −.2%. Equivalent weight—268; pKa=9.4.

The crystalline Noformicin hydrochloride has the following formula:

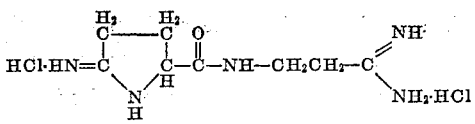

*Elemental analysis.*—Calculated: C=35.57%, H=6.53%, N=25.93%, Cl=26.25%. Found: C=36.5%, H=6.0%, N=25.8%, Cl=24.6%.

When tested for optical activity the value $\alpha_d^{25}$ (cons. 1% in water)=+07. When made alkaline the specific rotation of −16 is observed. Both of these specific rotations, however, are too low to be of particular significance.

Figure 5:
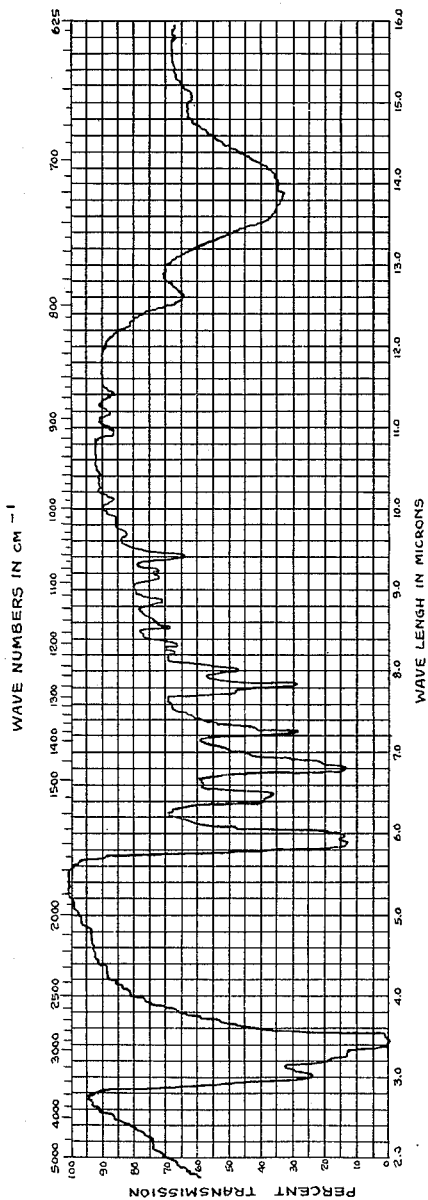

The infra-red absorption curve for the crystalline hydrochloride, mulled in petrolatum is shown in Fig. 5 of the drawing. This curve shows broad infra-red absorption in the 3–4$\mu$ region, at least two bands at 5.92$\mu$ and 6.0$\mu$, and a moderate band at 6.45$\mu$.

Survival index equaled 1.91 at 2 x 0.1 meg. dose (12 mice, subcutaneous).

It will be evident from the structural formula that Noformicin and its salts can exist in two isomeric forms, and it has been found that only the isomer derived from fermentation broth is active. This is evidenced by the fact that the synthetically prepared hydrochloride, which is a racemic mixture shows only one-half the activity when tested against swine influenza in mice in accordance with the assay procedure herein described.

Example VI

The hydrochloride salt (0.25 gm.) prepared as described in Example V was dissolved in 10 ml. of warm methanol and a methanolic solution (3.4 ml.) containing 0.46 gm. of triethylamine sulfate was added to the solution. This is about 1.5 times the theoretical amount of sulfate. Material began to crystallize before all the solution of sulfate was added. Crystallization was brought to completion by cooling one hour at 0–10° C.

The crystalline precipitate was centrifuged off, washed with ether and dried. It was then dissolved in about 1 ml. of water and the solution was diluted dropwise with an equal volume of methanol (crystallization began before all the methanol was added). The crystalline sulfate was separated by centrifugation, washed twice with methanol and dried, wt. 0.29 gm. and melted with decomposition at about 263° C.

*Partial analysis.*—Found: C, 33.69; H, 5.88; N, 23.3; $SO_4$, 32.6%.

The sulfate and hydrochloride salts of the antiviral substance show no characteristic ultraviolet peaks and very little absorption over the range 2300 to 4000 A.

Example VII

A solution of 4.8 mg. of crystalline hydrochloride salt (prepared as described in Example V) in 2 ml. of water was mixed with 10 mg. of picric acid and warmed to effect solution of the latter substance. On cooling the clear yellow solution, fine yellow needles of the picrate salt of the antiviral substance separated. The crystals, after washing with water and drying in vacuo, weighed 10.0 mg. and melted at 261–262° (dec.) (microblock).

Example VIII

Approximately 90 pounds (2 cu. ft.) of Amberlite IRC–50 resin on the sodium cycle was positioned in a column 6 inches in diameter and 11 feet long. The resin was flushed with several volumes of water. 1000 gallons of a filtered fermentation broth prepared as described in Example I was passed through the column at the rate of about 50 gallons per hour. The column was washed with water and the activity selectively eluted with 0.1 N hydrochloric acid at a rate of about 50 gallons per hour. The acidic eluate was periodically neutralized with sodium hydroxide. The various eluates thus obtained were concentrated under reduced pressure to a final volume of about 1 gallon (10–20% total solids) and then freeze dried. The solids thus obtained were assayed by the standard swine influenza virus assay using 12 mice.

The following table demonstrates typical results obtained by this process:

|  | Run I | | Run II | | Run III | |
|---|---|---|---|---|---|---|
|  | st., g. | SI/mg. | wt., g. | SI/mg. | st., g. | SI/mg. |
| above ph 6.0 | 3,850 | 1.09/15 | 1,700 | 1.02/20 | 1,400 | 0.97/20 |
| pH 6.0-2.0 | 435 | 1.36/20 | 240 | 1.49/10 | 588 | 1.59/20 |
| ph 2.0 and lower | 1,855 | 1.28/10 | 1,100 | 1.18/20 | 1,050 | 1.40/10 |

*Example IX*

A 51 g. sample of antiviral concentrate obtained as described in Example IV (survival index 1.66 at 2 x 3 mg. dose, 1.08 at 2 x 1 mg. dose) was dissolved in one liter of water. The solution was adjusted to pH 6.5 and filtered to remove a trace of insoluble material. The clear, dark filtrate was used for the rechromatographic experiment (an aliquot showed survival index 1.43 at 2 x 3 mg. dose).

A column was prepared with IRC-50 resin on the sodium cycle to give a layer of resin ¾" x 35" containing 250 ml. of the moist resin. The column was washed with water and was then used.

The filtrate containing the antiviral substance was allowed to percolate through the column at a rate of 3-4 ml. per minute. Development was carried out with one liter of water, 78 liters of dilute aqueous hydrochloric at pH 2.5, 3.2 liters of dilute hydrochloric acid at pH 1.1, and 3.6 liters of 0.2 N hydrochloric acid. Effluent fractions were collected as shown in the accompanying table at appropriate pH changes. Each fraction was concentrated to small volume and freeze-dried. Weights of fractions and assay values are shown in the table.

RECHROMATOGRAPHY ON IRC-50 RESIN

| Fraction | Vol. Liter | pH of Eluate | Wt. of solids, g. | Survival Index | |
|---|---|---|---|---|---|
|  |  |  |  | 2 x 3 mg. dose | 2 x 1.5 mg. dose |
| 1 | 1 | 7.0 | 39.4 | 1.38 |  |
| 2 | 9 | 7.0 to 5.7 | 9.6 | 1.51 |  |
| 3 | 7 | 5.7 | 5.8 | 1.30 |  |
| 4 | 7 | 5.7 | 2.9 | 1.56 |  |
| 5 | 20 | 5.7 | 4.3 | 1.64 |  |
| 6 | 20 | 5.7 to 5.0 | 5.8 | 1.77 |  |
| 7 | 4 | 5.0 to 4.9 | 0.45 | 2.16 X | 1.93 |
| 8 | 4 | 4.9 to 4.7 | 1.49 | 2.05 |  |
| 9 | 0.55 | 4.7 to 3.8 | 0.12 |  | 1.77 |
| 10 | 3.4 | 3.8 to 2.9 | 1.24 | 1.90 |  |
| 11 | 2.4 | 2.9 to 2.6 | 0.55 |  | 1.79 |
| 12 | 1.8 | 2.6 to 1.2 | 0.44 |  | 1.58 |
| 13 | 1.35 | 1.2 to 1.1 | 0.06 |  | 1.25 |
| 14 | 3.6 | below 1 | 0.01 |  | 1.40 XX |

X. One dose only; sample rather toxic.
XX. This value obtained with 2 x 0.25 mg. dose.

*Example X*

To 150 gallons of broth (about pH 8.0) prepared as described in Example I was added 1% Hyflo Supercel with agitation. The broth was filtered through a filter press followed by 10 gallons of water-wash. One percent Darco G-60 was added to the filtered broth and stirred ½ hour after which time 0.5%, Hyflo Supercel was added. This slurry was filtered through a filter press and the cake exhausted for ½ hour, washed with 10 gallons of water and exhausted for one hour. The damp cake was removed from the press and extracted twice with 1/10 the original broth volume of 85% aqueous methanol adjusted to pH 2.0 with hydrochloric acid. The rich methanol extracts were kept separate and neutralized to pH 7.0 with 30% sodium hydroxide, concentrated at 40° C. to 20% solids and freeze dried. Eluate I weighed 95 grams; S. I. 1.51 (2x15 mg. dose). Eluate II weighed 56 grams; S. I. 1.31 (2x15 mg. dose).

*Example XI*

An antiviral substance obtained as described in Example III having a survival index of 1.97 at 5. mg. was tested for effect on the multiplication of tobacco mosaic virus in tobacco leaf tissue. Turkish tobacco plants infected with tobacco mosaic virus were employed for the study. One set of infected plants served as the control for the experiment, a second set of infected plants was treated with a 0.1% solution of the antiviral agent. The antiviral agent caused no visible injury to the leaf tissue. The virus content of the control set and the treated set of plants was determined quantitatively by a method published in Science 117, 30 (1953). This method depends upon the actual isolation of tobacco mosaic virus from the infected leaves and its quantitative evaluation by determination of the optical density of the virus suspension.

The quantity of tobacco mosaic virus contained in the treated plants was decreased 69%, as compared with the quantity of virus contained in the control plants. The test has been repeated several times and the degree of decrease of virus multiplication has ranged from 70 to 90%. This decrease in virus content of an economically valuable plant is highly significant.

The term antiviral substance as applied herein to Noformicin compounds is to be understood as separate and distinct from the term antibiotic substance as the latter term is normally used.

Noformicin hydrochloride has no significant antibiotic activity as will be evident from the following tabulation showing comparative activities of the common antibiotics and Noformicin hydrochloride against 12 representative organisms.

| Material tested | Amount in (mcg.) | Organisms | | | | | | | | | | | |
|---|---|---|---|---|---|---|---|---|---|---|---|---|---|
|  |  | A | B | C | D | E | F | G | H | I | J | K | L |
| Terramycin | 200 | 12 | 21 | 16 | 20 | 15 | 8 | 18 | 22 | 30 | 28 | 23 | 27 |
|  | 50 | 9 | 16 | 8 | 14 | 9 | + | 13 | 19 | 27 | 24 | 18 | 22 |
| Chloromycetin | 200 | 16 | 22 | 16 | 23 | 15 | + | 20 | 18 | 27 | 23 | 17 | 24 |
|  | 50 | 18 | 17 | 10 | 14 | 9 |  | 14 | 12 | 18 | 16 | 10 | 17 |
| Penicillin G | 500 | 8 | 15 | 16 | X | 10.5 |  |  | X | X | X | 19 | X |
|  | 125 | + | 7 | 9 | 20 |  |  |  | X | X | X | 15 | X |
|  | 12 |  |  |  | X |  |  |  | 18 | 27 | 18 |  | 28 |
|  | 3 |  |  |  | X |  |  |  | 10 | 16 | 10 |  | 16 |
| Neomycin | 200 | 13 | 11 | 13 | 17 | 13 | 13 | 14 | 19 | 14 | 16 | 7 | 12 |
|  | 50 | 9 | 8 | 10 | 13 | 9 | 6 | 10 | 15 | 8 | 11 | 4 | 8 |
| Bacitracin | 200 | X | X | X | X | X | X | X | 13 | 23.1 | 8 | X | 19.5 |
|  | 50 | X | X | X | X | X | X | X | 9 | 19 | 4 | X | 17 |
|  | 12 | X | X | X | X | X | X | X | 4 | 14 | + | X | 12 |
| Streptomycin | 100 | 7 | 6 | 7 | 11 | 9 | 2 |  | 14 | 7 |  | + | 3 |
| Noformicin-hydrochloride | 1,000 |  |  |  |  |  |  |  |  | 10 |  |  | 5 |
|  | 10,000 | 6 |  |  | 11 |  | 5 | 8 | 19 | + | 9 | 15 |  |

X=Not tested.
A=K. pneumo.: B=Sh. dys.: C=S. schoh.: D=S. typhosa.: E=E. coli: F=Ps. cerug.: G=Dillon: H=M. pyogenes: I=D. pneumo.: J=Sm—R—M₄; K=S. Faecalis: L=S-C-203.

In the tests reported in the foregoing table a solution of the antibiotic is prepared at the concentration noted and the solution placed in a small cup which rests on agar which has been seeded with the test organism. The number recorded is that of the diameter of the zone of inhibition of the test organism around the cup containing the sample. The first seven organisms are usually considered gram negative organisms whereas the last five are gram positive organisms. It is readily apparent that even at a concentration 10,000 mcg. which is 20 to 3333 times that of the above antibiotics that Noformicin exerts only a small effect on a few of the organisms whereas all of the other antibiotics are much more active. Although it is difficult to estimate the order of activity precisely it is considered that the above data indicate that Noformicin has about 1% as much activity as an ordinary antibiotic. Since the common dosages of these antibiotics is about 1–2 g. per day per man, it is readily apparent that Noformicin, which would require a dosage of 100–200 g. per day to exert similar activity, is not an antibiotic in the usual sense of the word.

Various changes and modifications in the procedures herein described may occur to those skilled in the art, and to the extent that such changes and modifications are embraced by the appended claims, it is to be understood that they constitute part of our invention.

We claim:

1. The process that comprises contacting fermentation broth produced by the organism Nocardia formica with an adsorbent material selected from the group consisting of charcoal and cation exchange resins, eluting the adsorbed material with an aqueous acidic solution which also contains alcohol when charcoal is the adsorbent, transferring the eluate to a second adsorbent material arranged in a chromatographic column and selected from the group consisting of charcoal and cation exchange resins, developing the column with water which also contains alcohol when the adsorbent is charcoal, eluting the column with aqueous acid solution which also contains alcohol when the adsorbent is charcoal, and collecting fractions of eluate having a pH below about 6.0 and concentrating the collected eluate to thereby obtain a substance having antiviral activity.

2. The process as defined in claim 1 wherein the acid employed in at least one of the elution steps is a mineral acid.

3. The process as defined in claim 1 wherein the acid employed in at least one of the elution steps is a lower aliphatic carboxylic acid.

4. The process as defined in claim 1 wherein the adsorbent material employed in at least one of the adsorption steps is charcoal, and an aqueous-alcoholic acid solution is employed for eluting adsorbed material from the charcoal.

5. The process as defined in claim 1 wherein the adsorbent material employed in at least one of the adsorption steps is a cation exchange resin deriving its exchange capacity from carboxylic groups.

6. The process as defined in claim 1 wherein the acidic eluate is neutralized prior to concentration.

7. The process as defined in claim 1 wherein the collected eluate is concentrated to small volume and freeze dried to obtain a crude antiviral substance in solid form.

8. The process as defined in claim 1 wherein the eluate fractions are obtained by eluting with a hydrochloric acid solution and are further treated by neutralizing the excess acid therein, concentrating to small volume, adding methanol to crystallize out inorganic salts, concentrating the residual solution to precipitate crude antiviral hydrochloride, and purifying the same by recrystallizing from a solvent mixture comprising about 1 part of methanol to 5 parts of 2-nitropropane.

9. The process for recovering an antiviral substance from a fermentation broth produced by the organism Nocardia formica that comprises contacting the fermentation broth with an adsorbent selected from the group consisting of charcoal and cation exchange resin, removing the residual broth, eluting adsorbed material with an aqueous acidic solution which also contains alcohol when the adsorbent is charcoal, and concentrating the resulting eluate to small volume.

10. The process for recovering an antiviral substance from a fermentation broth produced by the organism Nocardia formica that comprises contacting the fermentation broth with charcoal, removing the residual broth, eluting adsorbed material from the charcoal with an aqueous-alcoholic acidic solution, and concentrating the resulting eluate to small volume.

11. The process for recovering an antiviral substance from a fermentation broth produced by the organism Nocardia formica that comprises contacting the fermentation broth with a cation exchange resin deriving its exchange capacity from carboxylic groups, removing the residual broth, eluting adsorbed material from the resin with an aqueous acidic solution, and concentrating the resulting eluate to small volume.

12. The process for purifying an antiviral substance derived from a fermentation broth produced by the organism Nocardia formica that comprises adding an aqueous solution of crude antiviral substance to a chromatographic column of adsorbent material, developing and eluting the column with an aqueous acidic solution, and collecting and concentrating fractions of eluate having a pH below about 6.0.

13. The process as defined in claim 12 wherein the adsorbent material is a cation exchange resin deriving its exchange capacity from carboxylic groups.

14. The process as defined in claim 12 wherein the adsorbent material is charcoal and the eluting solvent is an aqueous-alcoholic acidic solution.

15. The process for obtaining in crystalline form the antiviral substance derived from a fermentation broth produced by the organism Nocardia formica that comprises providing a concentrated aqueous solution of crude hydrochloride salt of the antiviral substance, crystallizing out inorganic salts by addition of methanol, concentrating the residual solution to precipiate the hydrochloride, redissolving the precipitate in methanol, adding about 5 volumes of 2-nitropropane, and chilling the resulting mixture to crystallize the hydrochloride salt of the antiviral substance.

16. An antiviral substance selected from the group consisting of acid salts of β-(5-imino-2-pyrrolidinecarboxamido)-propamidine.

17. An antiviral substance as defined in claim 16 in the form of the hydrochloride salt.

18. An antiviral substance as defined in claim 16 in the form of the sulfate salt.

19. An antiviral substance as defined in claim 16 in the form of the picrate salt.

20. The crystalline antiviral substance of the formula

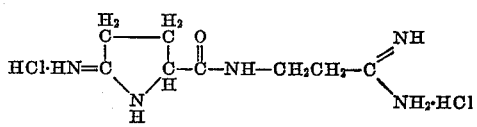

No references cited.